United States Patent [19]

Cera et al.

[11] Patent Number: 4,464,184
[45] Date of Patent: Aug. 7, 1984

[54] APPARATUS AND METHOD FOR THE CONTROL OF THE PRECOATING OF AN EFFLUENT FILTRATION BAGHOUSE UTILIZING CLEAN SIDE PRESSURE MEASUREMENT

[75] Inventors: Thomas J. Cera, North Township, Lake County; Charles A. Price, Portage, both of Ind.

[73] Assignee: United States Steel Corporation, Pittsburgh, Pa.

[21] Appl. No.: 443,409

[22] Filed: Nov. 22, 1982

[51] Int. Cl.³ .................. B01D 46/02; B01D 46/42
[52] U.S. Cl. .................................. 55/21; 55/97; 55/262; 55/270; 55/271
[58] Field of Search .............. 55/21, 97, 262, 266, 55/270, 271; 210/193, 741, 777

[56] References Cited

U.S. PATENT DOCUMENTS

| | | | |
|---|---|---|---|
| 2,971,648 | 2/1961 | Lane et al. | 210/75 |
| 3,679,052 | 7/1972 | Asper | 210/777 |
| 3,892,543 | 7/1975 | Margraf | 55/97 |
| 4,010,013 | 3/1977 | Murayama et al. | 55/262 |
| 4,042,667 | 8/1977 | Ishiwata et al. | 55/97 |
| 4,097,251 | 6/1978 | Murayama et al. | 55/97 |
| 4,118,778 | 10/1978 | Strub | 364/502 |
| 4,294,597 | 10/1981 | Archer et al. | 55/283 |

FOREIGN PATENT DOCUMENTS

| | | | |
|---|---|---|---|
| 54-153384 | 12/1979 | Japan | 55/271 |
| 6813835 | 4/1970 | Netherlands | 210/777 |

*Primary Examiner*—David L. Lacey
*Attorney, Agent, or Firm*—George D. Dickos

[57] ABSTRACT

A method and apparatus for the control of the precoating process employed in an effluent filtration baghouse are described. An electrically operated pressure switch is provided to indicate the precoat duct vacuum pressure by measuring the vacuum pressure of the clean side of the baghouse. Should a precoat duct pressure insufficient to sustain the flow of precoat material be indicated, the pressure switch will halt the feed of precoat material into the precoat duct, thus avoiding the congestion of the precoat duct by the precoat material and the consequent inadequate precoating of the baghouse bags.

11 Claims, 1 Drawing Figure

U.S. Patent   Aug. 7, 1984   4,464,184
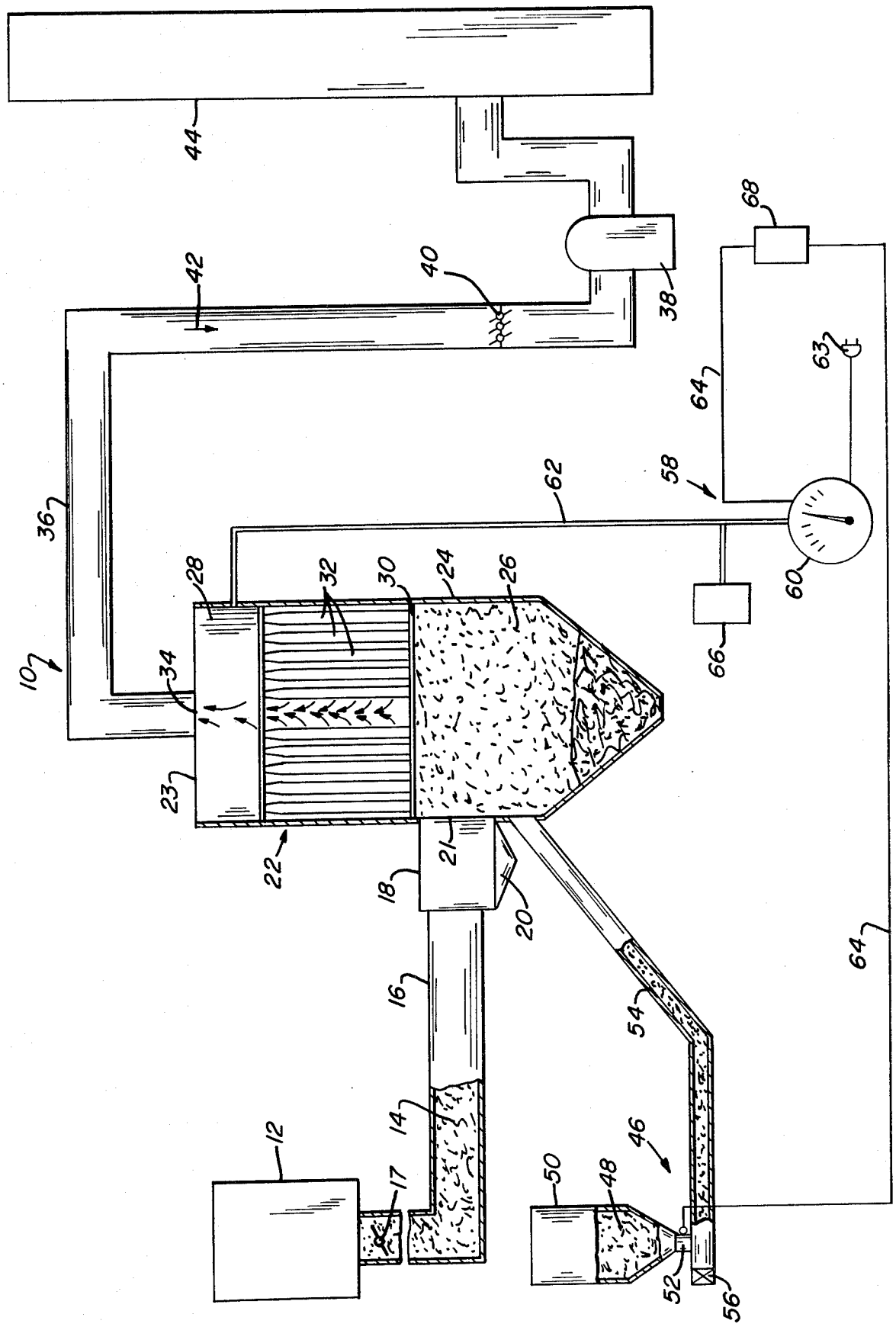

APPARATUS AND METHOD FOR THE CONTROL OF THE PRECOATING OF AN EFFLUENT FILTRATION BAGHOUSE UTILIZING CLEAN SIDE PRESSURE MEASUREMENT

DESCRIPTION OF THE INVENTION

BACKGROUND

The present invention relates to the filtration of effluents by means of a baghouse and, in particular, to a method and apparatus for the effective control of the precoating of the bags of the baghouse.

As a result of the contemporary emphasis on environmental quality, various air pollution control means have been developed. One such means for controlling air pollution to which this invention particularly relates has been the separation of unwanted particulate matter from a gas stream by fabric filtration.

The dust collection apparatus used to accomplish such particle separation is known in the trade as a "baghouse". Basically, a baghouse is a sheet metal housing divided into at least two chambers by a tube sheet having a plurality of vertically suspended fabric tubes or bags in which cylindrical wire cages may be provided for skeletal support. A plurality of such chamber pairs may be combined to comprise a baghouse with several distinct parallel filtration compartments. A particle-laden gas stream, induced by the action of a fan, flows into the lower chamber (dirty-air chamber) of a compartment wherein dust accumulates on the cloth bags as the gas passes through the fabric into the upper chamber (clean-air chamber) and out the exhaust. Continuous operation of the unit causes a cake of dust to build up on either the inside or the outside of the bags, depending on which side of the bag is exposed to the inlet of the effluent. Such a dust cake will, unless removed, reduce and eventually stop the flow of gas through the filter. In order to alleviate the direct contact of the dust upon the bags themselves and the resultant complications to the system, the bags are usually precoated with a suitable precoat material such as limestone powder.

It will be easily appreciated that the most critical and yet sensitive elements of such a filtration system are the bags themselves. Due to the criticality of the function the bags perform the precoating of the bags is necessary for several interrelated reasons. First, the precoating of the bags prevents a solid coating of dust matter from accumulating directly on the bags. The deposition of such a solid coating on the bags is harmful in various ways. For example, a solid coating on the bags results in a higher resistance to flow through the system and a resultant drop in overall system efficiency. Also, the direct contact of particulate matter in the form of a solid coating on the fabric bags causes both direct damage to the bags and to the system as a whole. The direct contact of particulate matter on the costly filtration bags greatly accelerates the deterioration of the fabric from a variety of causes including chemical attack, thermal erosion, abrasion and, mechanical stress through repeated flexing. Should bag failure occur during operation, the results would include a sudden increase of contaminants in the outlet stream, often in excess of legal and/or acceptable limits. Also, as the replacement of single bags is not practical, the operating personnel usually wait until several bags have failed and the contaminant content in the outlet stream has increased above acceptable limits before the entire baghouse system is shut down and the damaged bags are replaced.

A second reason that the bags are precoated prior to commencement of the filtration process is that precoating aids in the removal of particles from the effluent stream. Filtration bags treated with current precoat materials are more effective in the removal of particulate matter from a stream than untreated bags because the precoat material provides increased filtration surface area and improved chemical attraction to the particulates. In addition, the precoat material retains an adequate degree of porosity through the filter to avoid excessive flow resistance therethrough. Yet another reason for the application of a precoat material to baghouse bags is that it facilitates the removal of the filter cake from the bag surface.

From the above, the significance of precoating the filtration bags of a baghouse is readily apparent. As such, the precoating process must be properly controlled to assure complete precoating in order to gain full advantage of the above-described reasons for precoating. However, in many baghouse systems, the precoating procedure is improperly employed causing harm to the baghouse system in general, and to the filtration bags in particular. A widespread problem in baghouse precoating is a complete or partial failure to precoat the bags due to improper precoat control. As a specific example, precoating is often improperly performed due to the failure of the system to transmit the precoat material to the filtration bags. In usual baghouse construction and operation, the precoat material is fed into a precoat duct in communication with the baghouse by a precoat feeder and then drawn onto the baghouse bags by a fan which induces a negative pressure within the baghouse. Typically the fan which draws the precoat material through the precoat duct is the same fan which draws the effluent to be filtered from its source. However, conventional baghouse system design does not employ a fan which is of sufficient capacity to draw precoat material through the precoat duct while simultaneously drawing effluent to the baghouse from its source. The problem which arises frequently in such a situation is that the precoat material is not drawn through the precoat duct, accumulates therein and clogs the duct. Of course, when the precoat duct is clogged, precoat material cannot pass therethrough. This causes the bags to fail to be precoated and all of the above discussed problems inherent with non-precoated bags evolve. Further, the unclogging of the precoat duct involves an extensive, expensive clean-up operation and probable system downtime.

One possible solution to the problem of precoat duct clogging due to insufficient suction to draw precoat material therethrough would be to install a separate precoat duct blower to assist precoat material flow. However, this attempted solution would increase capital costs for the system as well as operating and maintenance costs. Another possible solution is to add costly precoat flow aids to the precoat material which would increase operating costs and are often ineffective in assuring proper precoat material transmission.

The subject invention is directed toward an improved means for controlling the precoating of baghouse filtration systems which overcomes, among others, the above discussed problems and provides a baghouse precoat control method and means which are effective in the control of baghouse preoating yet do not necessitate a significant increase in baghouse capital, operating and/or maintenance costs.

SUMMARY OF THE INVENTION

In accordance with the present invention, there is provided a method and apparatus for the effective control of the baghouse precoating function. The baghouse precoat control described includes an electrical pressure sensing device which is installed on the clean side of the baghouse and thus measures the negative pressure within the baghouse which is an indication of the suction present in the precoat duct. The electrical pressure sensing device is operatively connected to and controls the precoat material feeder which introduces precoat material into the precoat duct. Should a negative pressure within the baghouse insufficient to sustain precoat material flow through the precoat duct be indicated, the electrical pressure sensing device will cause the discontinuance of the feed of precoat material into the precoat duct. This will prevent the introduction of precoat material to the duct which would inevitably cause the clogging thereof due to inadequate suction in the duct. Upon the reestablishment of sufficient precoat duct suction to sustain precoat flow, precoat material feed is resumed preferably following a short time delay.

Accordingly, the present invention provides solutions to the aforementioned problems present in the baghouse filtration process. As this invention provides an effective means of controlling the precoating of the baghouse bags, the problems caused by the lack of or inadequate precoating are resolved. In addition, significant capital, operating and/or maintenance costs are avoided.

These and other details, objects, and advantages of the invention will become apparent as the following description of the present preferred embodiment thereof proceeds.

BRIEF DESCRIPTION OF THE DRAWING

In the accompanying drawing, I have shown a present preferred embodiment of the invention wherein:

The FIGURE is a schematic drawing of the baghouse precoat control apparatus disclosed herein.

DETAILED DESCRIPTION OF THE INVENTION

Referring now to the drawing wherein the showings are for purposes of illustrating the present preferred embodiment of the invention and not for purposes of limiting same, the FIGURE shows an effluent filtration system generally designated as 10.

More particularly, there is shown in the FIGURE a source of gas-borne effluents generally designated as 12. Source 12 may consist of, by means of example only, a coke oven, a furnace, a sinter plant, or any source of gas-borne pollutants or effluents 14. The effluents 14 are conducted from the source 12 to the filtration system 10 by means of ductwork 16 having an inlet valve means 17. The duct 16 may deliver the gaseous effluents 14 to a spark trap 18 of the filtration system 10. The spark trap 18 may include a series of baffle plates (not shown) whereby large particulates are deflected into a hopper 20.

The effluents 14 are then directed into the baghouse 22 of the filtration system 10 through inlet port 21. The housing 23 of baghouse 22 may actually include several distinct filtration compartments 24 each having an inlet (dirty-air) and outlet (clean-air) chamber 26 and 28, respectively. However, for purposes of clarity of the present specification, the filtration system will only be described in terms of the baghouse including only one such compartment 24 while it is to be understood that the specification, claims and drawing herein are intended to also comprehend a multi-compartment baghouse 22. Disposed between the inlet chamber 26 and the outlet chamber 28 is a manifold means 30. Following the passage of effluents 14 into inlet chamber 26 and through manifold 30, the effluents 14 come in contact with a tube sheet having a plurality of fabric tubes or bags 32 which are vertically suspended near the top of outlet chamber 28, the bottoms of which are suitably anchored at manifold 30. Accordingly, the pollutant matter contained in effluent 14 is trapped by the bags 32 while the clean gas 42 proceeds into outlet chamber 28. An exhaust port 34 is provided in the outlet chamber 28 and is fitted with a conduit 36 for exhausting clean gas 42 from the outlet chamber 28.

As shown in FIG. 1, a fan 38 controlled by a damper 40 may be operatively connected to the exhaust conduit 36 in order to pull gas through the baghouse 22, the effluent input duct 16 and the baghouse bag precoat system (to be discussed below). The clean air 42 is then exhausted to the atmosphere by means of a stack 44.

In order to effectuate the precoating of the bags 32 for, inter alia, the reasons set forth in the above Description of the Invention Background, a precoat system, generally designated as 46, may be employed. The precoat material 48 used to coat the bags 32 may consist of a limestone powder or any suitable precoat material. The precoat material 48 is contained in a precoat reservoir 50. The feed of precoat material 48 into the remainder of precoat system 46 is accomplished by an electric motor operated precoat feeding means 52. Precoat material 48 is conducted to the baghouse bags 32 as suspended particles by means of a precoat duct 54 which is operatively connected between precoat feeder 52 and the inlet chamber 26 of the baghouse 22 and has a conveying gas input vent 56. From inlet chamber 26, the precoat material 48 passes through the manifold 30 and onto the surface of the bags 32 themselves. As was indicated above, the fan 38 is the means which provides the motivation for the precoat material 48 to travel along the precoat duct 54 and onto the bags 32. This is accomplished as the fan 38 creates a significant negative pressure on the baghouse 22 and consequently on the effluent inlet duct 16 and the precoat duct 54 to draw the contents of the respective ducts to the filtration bags 32. With regard to flow of precoat material 48 through the precoat duct 54, any precoat material 48 fed into duct 54 by precoat feeder 52 is to be drawn to the bags 32 as suspended particles by means of a relatively high velocity gaseous precoat conveying medium introduced to the precoat duct 54 through vent 56. Typically, the vent 56 will be exposed to the atmosphere and hence the precoat conveying medium will be air. On the basis of the above, it is apparent that for the precoat material 48 to be conveyed along precoat duct 54 there must be sufficient negative pressure therein to move the gaseous conveying medium at a great enough velocity to sustain precoat material 48 flow. We have found that a typical minimum gas velocity in the precoat duct 54 to sustain precoat material 48 flow is on the order of 3500–8000 feet per minute depending, of course, on the parameters of the overall precoat system 46 and the precoat material 48 used. Should an insufficient negative pressure be present in the precoat duct 54, the precoat material will not pass to the bags 32 thus resulting in insufficient precoating thereof. As a complicating problem, if there is insufficient negative pressure in the precoat duct 54 to sustain precoat material 48 flow, the precoat material 48 itself will rest in and clog precoat duct 54. Should the duct 54 become clogged, no precoat material 48 may pass therethrough and the bags 32 will not be precoated which results in, among others, the above-discussed problems.

In view of the above situation, we have determined that a sufficient negative pressure must be present in the precoat duct 54 to sustain precoat material 48 flow. In this regard, among others, the fan 38 plays an important role in the operation of the overall filtration system 10. In typical filtration systems 10 due often to the excessive capital costs involved the fan 38 is not designed to provide sufficient negative pressure to the system 10 to accomplish precoating of the bags 32 and suction of effluents 14 simultaneously. Therefore, the precoating process is designed to preferably only occur when effluents are not being drawn to the baghouse 22. That is, if the effluent inlet valve means 17 is open to the effluent source 12, insufficient negative pressure will typically be present in the baghouse 22 to draw both the effluents 14 and the precoat material 48 to the baghouse. The result of this lack of negative pressure is that the precoat material 48 will not reach the bags 32 to effectuate precoating and the precoat duct 54 will clog preventing any precoating pending the manual clearing of the duct 54.

To avoid the problems associated with the insufficient or lack of coating of the baghouse bags 32, the control method and apparatus of the present invention is directed. In accordance with the present invention, there is provided a control apparatus 58 for the control of the precoating of bags 32. The control apparatus 58 includes a pressure switch 60 which receives a pneumatic impulse from the output chamber 28 of the baghouse 22 by means of conduit 62. It must be noted that the pneumatic impulse from the output chamber 28 is directly proportional to the negative pressure which is present in the precoat duct 54. As the negative pressure in the precoat duct 54 is directly related to the velocity of the gaseous conveying medium of the precoat material 48, the above-discussed pneumatic impulse is directly related to the gaseous conveying medium velocity. The output from the pressure switch 60, which may preferably comprise an electrical pressure switch powered by a power source 63 and having a variable set point, is operatively connected to the control for the precoat feeder 52 in a manner such that when the pressure switch 60 indicates a negative pressure in the output chamber 28 below the set point which corresponds to an insufficient negative pressure in the precoat duct 54 to draw the gaseous conveying medium at a velocity sufficient to sustain precoat material 48 flow with the precoat duct 54, the pressure switch 60 will, by means of wire 64, cause the precoat feeder 52 to halt the flow of precoat material 48 to the precoat duct 54. Accordingly, no precoat material 48 will be introduced into the precoat duct 54 when there is insufficient gaseous conveying medium velocity to sustain precoat material 48 flow and hence avoid insufficient precoating or the clogging of duct 54. A variable timer 68 is preferably provided in line 64 in order to interpose a short time delay, for example 5 to 30 seconds, between the establishment of sufficient precoat duct 54 negative pressure and the resumption of power to the precoat feeder 52.

This time delay is desirous in order to assure the withdrawal of any precoat material 48 from precoat duct 54 which may have remained therein and to assure a continued sufficient velocity of the gaseous conveying medium. In addition to the above, a chart recorder 66 may be operatively connected to conduit 62 to continuously record the negative pressure in the outlet chamber 28.

In operation, the pressure switch 60 may continually monitor the pressure in the output chamber 28 which is directly related to the negative pressure, and hence the gaseous conveying medium velocity, within the precoat material duct 54. When precoating of the filtration bags 32 of the baghouse 22 is required, the pressure switch 60 measures the negative pressure within the output chamber 28 and controls the feed of precoat material 48 into the precoat duct 54 by the precoat feeder 52 so as to halt the feed of precoat material 48 thereinto upon the measurement of a negative pressure below a predetermined level. This predetermined level will correspond to that negative pressure within the outlet chamber 28 which corresponds to a negative pressure in the outlet duct 54 sufficient to maintain the flow of gaseous conveying medium at a velocity sufficient to ensure flow of precoat material 48 therethrough. A typical velocity of gaseous conveying medium through the precoat duct 54 to sustain precoat material 48 flow may be on the order of 3500–8000 feet per minute. Upon the establishment of a negative pressure in outlet chamber 28 indicative of sufficient negative pressure within duct 54 to sustain precoat material flow, the pressure switch 60 will, following a short delay interposed by timer 68, cause the precoat material feeder 52 to introduce sufficient precoat material 48 to the precoat duct 54 to complete the requisite precoating of bags 32. Therefore, the pressure switch 60 will only allow precoat material to be fed into precoat duct 54 when there is sufficient negative pressure therein to sustain precoat material 48 flow and hence avoid inadequate precoating or the clogging of precoat duct 54.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. Apparatus for controlling the application of a precoat material to the bags of an effluent filtration baghouse, said baghouse having an effluent input side having a gas inlet means and a clean side having a gas outlet means, comprising:
    a. a reservoir containing precoat material;
    b. a duct extending between said reservoir and said baghouse to establish fluid communication therebetween;
    c. a feeding means operatively communicating with said reservoir to feed said precoat material into said duct;
    d. means for inducing a draft of a gaseous conveying medium through said duct and said baghouse, respectively, to convey said precoat material introduced into said precoat duct through said duct and onto said bags;
    e. control apparatus having means for sensing the pressure on said clean side of the baghouse and for producing an output signal having intensity in proportion to the measured pressure and having regulating means operatively connected to said sensing means and said feeding means to halt the feed of precoat material by said feeding means into said duct upon the receipt of an output signal of intensity below a predetermined level and to allow the feed of precoat material upon the receipt of an output signal of intensity above said predetermined level.

2. The apparatus of claim 1 in which the control apparatus is constructed such that the predetermined level of said output signal corresponds to that pressure which is sufficient to assure the flow of said precoat material through said precoat duct and onto the bags of said baghouse.

3. The apparatus of claim 2 further comprising a timing means operably connected between said regulating means and said feeding means to interpose a time delay between the receipt of an output signal above said predetermined level and the allowance of feed of precoat material.

4. The apparatus of claim 3 in which said control apparatus comprises a pressure switch which is operative to sense the pressure on said clean side of the baghouse and is operatively connected to said feeding means to halt the feed of precoat material by said feeding means into said duct upon the receipt of an output signal of intensity below a predetermined level and to allow the feed of precoat material upon the receipt of an output signal of intensity above said predetermined level.

5. The apparatus of claim 4 wherein said means for inducing a draft comprises vacuum means operatively in flow communication with said gas outlet means.

6. The apparatus of claim 5 in which said control apparatus is constructed such that the predetermined level of said output signal corresponds to that pressure that would yield a rate of flow of said gaseous conveying medium through said precoat duct of at least three thousand five hundred (3,500) feet per minute.

7. Method for controlling the application of a precoat material to the bags of an effluent filtration baghouse which has effluent input and clean sides, comprising the steps of:
   a. feeding said precoat material from a reservoir into a precoat material duct extending between said reservoir and said baghouse;
   b. inducing a draft of a gas conveying medium through said duct and into said baghouse to convey said precoat material through said duct and onto said bags;
   c. measuring the pressure on the clean side of said baghouse; and,
   d. controlling the feeding of said precoat material into said duct so as to halt said feeding upon the measurement of a pressure below a predetermined level.

8. Method of claim 7 in which said predetermined level corresponds to that pressure which is sufficient to assure the flow of said precoat material through said precoat duct and onto the bags of said baghouse.

9. Method of claim 8 including interposing a time delay between the receipt of an output signal above said predetermined level and the allowance of feed of precoat material.

10. Method of claim 9 in which said induced draft is a vacuum draft.

11. Method of claim 10 in which the predetermined level corresponds to that pressure which would yield a rate of flow of said gas conveying medium through said precoat duct of at least three thousand five hundred (3,500) feet per minute.

* * * * *